May 4, 1954  A. G. BLOSS  2,677,307
APPARATUS AND METHOD FOR TRUING WHEEL
TREADS OF RAILROAD VEHICLES
Original Filed Sept. 3, 1948  4 Sheets-Sheet 4

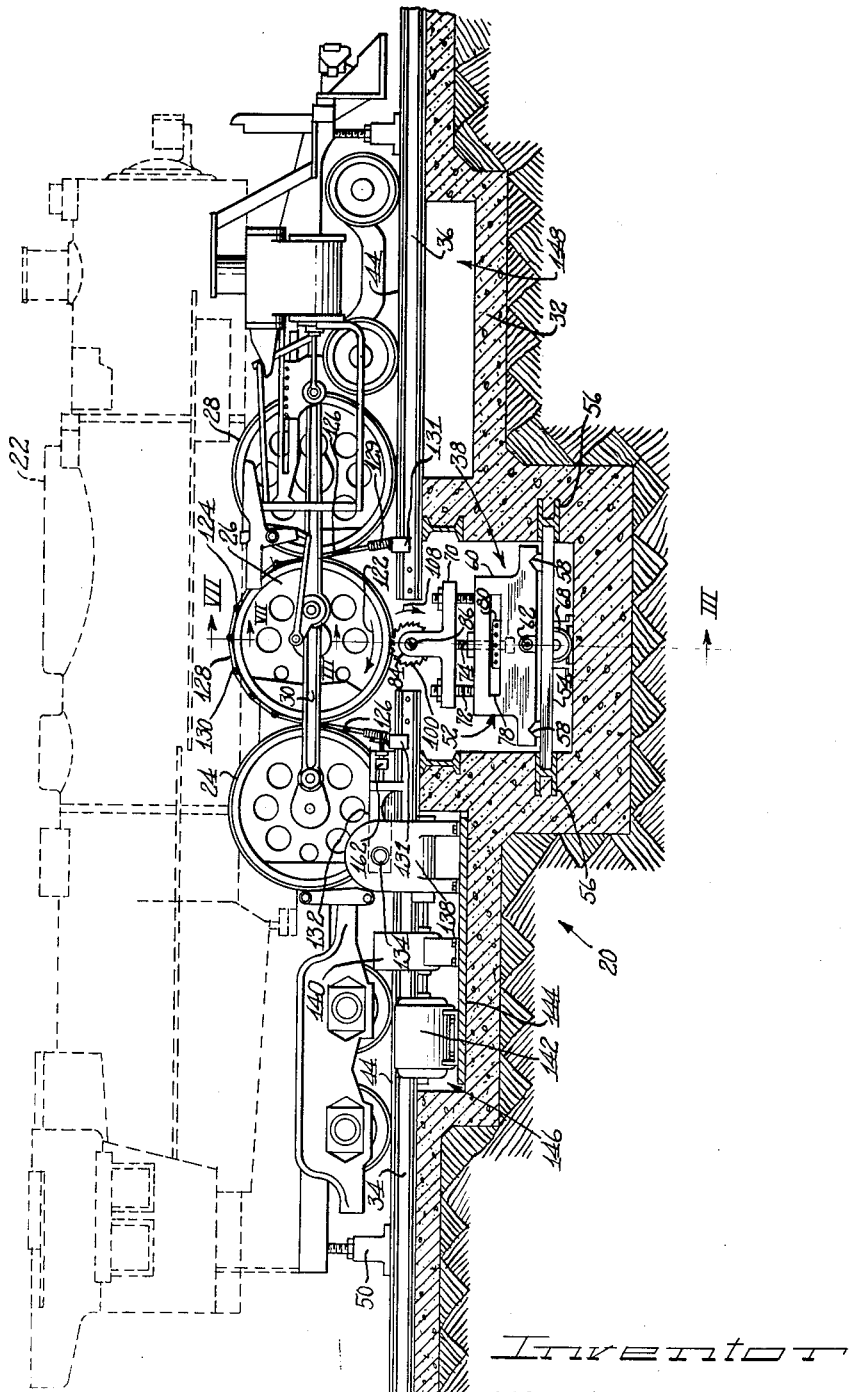

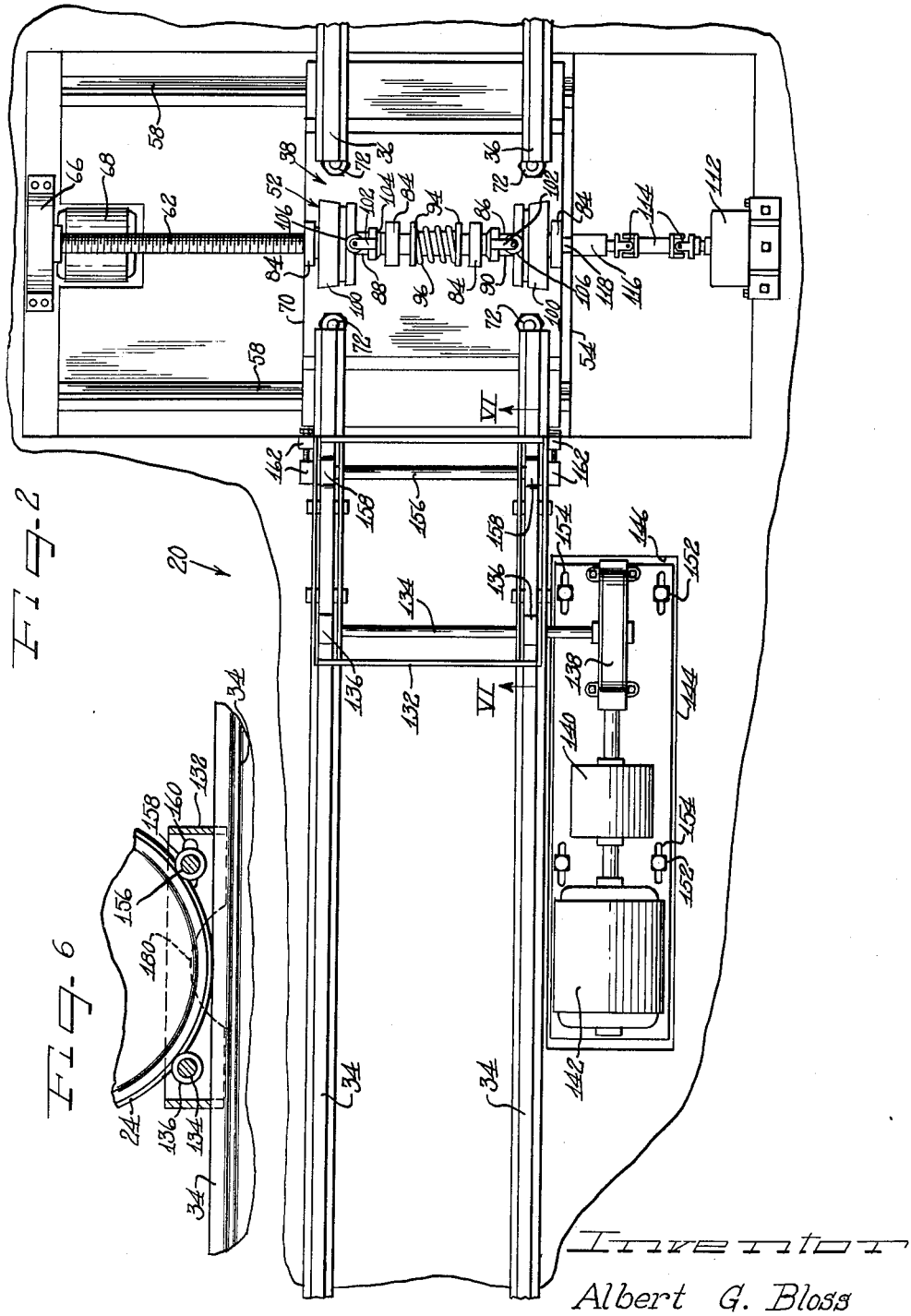

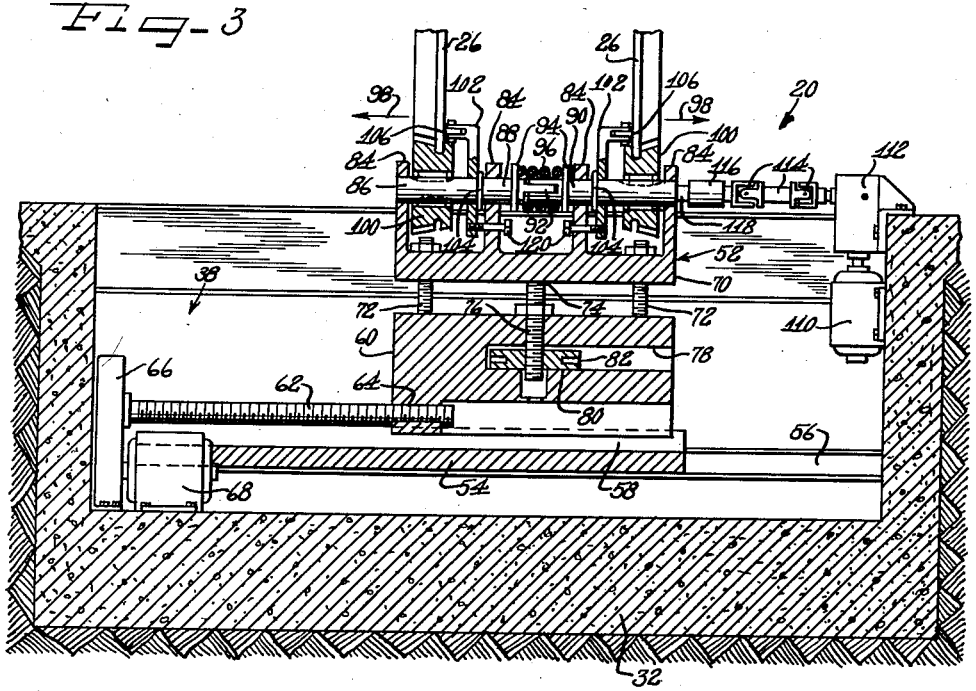

Inventor
Albert G. Bloss

Patented May 4, 1954

2,677,307

UNITED STATES PATENT OFFICE 2,677,307

APPARATUS AND METHOD FOR TRUING WHEEL TREADS OF RAILROAD VEHICLES

Albert G. Bloss, Huntington, W. Va.

Continuation of abandoned application Serial No. 47,708, September 3, 1948. This application September 6, 1951, Serial No. 245,410

15 Claims. (Cl. 90—11)

This application is a continuation of my pending application Serial No. 47,708 filed September 3, 1948, now abandoned.

This invention relates to new and useful improvements and structural refinements in devices for truing wheel treads of locomotives, passenger cars, box cars, and the like, and the principal object of the invention is to facilitate the truing of wheel treads without the conventionally experienced necessity of removing the wheels from the vehicle.

In particular, the invention contemplates the provision of means for truing the driving wheels of locomotives, which operation in conventional practice could be undertaken only after removing the connecting rods and also removing the wheels for the purpose of truing or turning the wheel tread in a suitable lathe. In accordance with the teachings of the invention, the wheel treads may be trued while the wheels remain in position on the locomotive or railroad car and without the necessity of removing the wheels from the vehicle.

According to the general features of the present invention, means are provided to support wheels in indexed relation to the truing apparatus and the wheels are accurately trued upon a single rotation of the wheels relative to the truing apparatus.

An additional feature of the invention resides in the provision of means for adapting the wheel tread truing means and the aforementioned wheel driving means for the performance of their respective work on various sets of wheels of the locomotive, cars, or the like, as the case may be.

A further feature of the invention lies in the particular method involved in the performance of the wheel tread truing operation.

An important advantage of the invention resides in its simplicity of construction and in its adaptability for installation in railway shops with extensive as well as limited facilities.

With the above more important objects and features in view and such other objects and features as may become apparent as this specification proceeds, the invention consists essentially of the arrangement and construction of parts as illustrated in the accompanying drawings, in which:

Figure 1 is a cross sectional view of a railway repair pit, showing the invention in readiness for use for turning or truing wheel treads of a locomotive illustrated by phantom lines;

Figure 2 is a fragmentary top plan view of the invention per se;

Figure 3 is a cross sectional view, taken substantially in the plane of the line 3—3 in Figure 1;

Figure 4 is a fragmentary side elevational view of a track used in the invention;

Figure 5 is a cross sectional view, taken substantially in the plane of the line 5—5 in Figure 4;

Figure 6 is a cross sectional view, taken substantially in the plane of the line 6—6 in Figure 2;

Figure 7 is a cross sectional view, taken substantially in the plane of the line 7—7 in Figure 1;

Like characters of reference are employed to designate like parts in the specification and throughout the several views.

Figure 8:
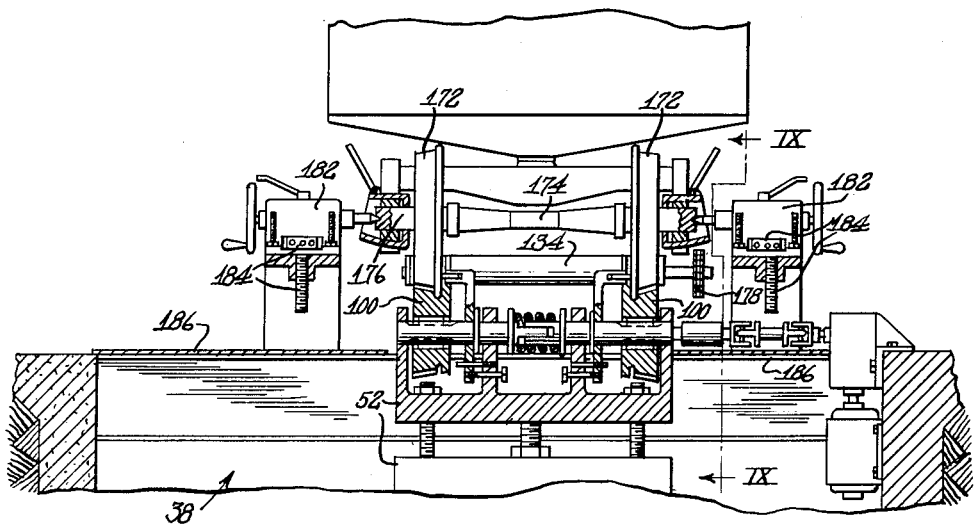
Figure 8 is a cross sectional view of a modified embodiment of the invention, the same being adapted for truing wheel treads of passenger cars, etc.; and, Figure 9 is a cross sectional view, taken substantially in the plane of the line 9—9 in Figure 8.

Referring now to the accompanying drawings in detail, more particularly, to Figures 1–7, inclusively, the invention designated generally by the reference character 20 consists of an apparatus for truing wheel treads of railway vehicles such as, for example, of a locomotive 22 equipped with several pairs of driving wheels, 24, 26, 28, etc. These wheels in each pair are, of course, rigidly secured to the common axle, and the several pairs of driving wheels are connected together for simultaneous rotation by means of connecting rods 30.

Means are provided for stationing the locomotive 22 so that a pair of its wheels are available, so to speak, for the wheel tread turning or truing operation, this means involving a suitable concrete bed 32 on which are mounted longitudinally aligned, mutually spaced track sections 34, 36, as is best shown in Figures 1 and 6. An open pit 38 is provided in the concrete bed 32 under the space between the track sections 34, 36, and it is to be noted that the space between the track sections may be bridged as shown in Figure 4, by means of a pair of removable rail pieces 40. These rail pieces are removably secured to the rail sections 34, 36 by connecting plates 42 of conventional type, as will be clearly apparent.

If it is assumed that the pair of driving wheels 26 of the locomotive 22 are to be trued, the locomotive is driven or towed into position on the track sections 34, 36, so that the pair of wheels 26 are disposed on the removable rail sections 40. Thereupon, the rail section 40 may be removed, so that the wheels 26 are disposed immediately above the space between the track sections 34, 36 and immediately above the aforementioned pit 38. If desired, suitable angles 44 (see Figures 4 and 5) may be pivoted to the webs of the track sections 34, 36 as at 46, these angles normally lying on the heads of the track rails (34, 36) but not on the rail pieces 40. As a result, when the engine 22 is positioned on the track sections, the wheels 24, 28 will be disposed at a somewhat greater height with respect to the wheels 26 and removal of the rail pieces 40 will be facilitated. Needless to say, the angles 44 may be swung to a position shown by the phantom line 48 when the invention is not in use (see Figure 5) so that the rails 34, 40, 36 present a continuous, level travelling surfaces.

In any event, after the engine 22 has been stationed as shown in Figure 1 and the rail pieces 40 have been removed, the entire engine may be elevated by suitable means such as jacks 50, sufficiently to release the wheels 24, 28 from tractive engagement with the track sections 34, 36. In other words, the wheels are permitted to rotate without exerting tractive effort such as would tend to dislocate the entire locomotive from the wheel tread truing position.

The means for performing the wheel tread truing operation are mounted in the aforementioned pit 38 and consist of a machine designated generally by the reference character 52. This machine embodies in its construction a bed 54 mounted in suitable channels 56 embedded in the concrete 32, the bed 54 being provided with spaced parallel guides 58 on which a traveller 60 is slidable. It is to be noted that the pit 38 extends laterally to one side of the track sections 34, 36, whereby the traveler 60 may be slid laterally from under the tracks, and vice versa. The sliding of the traveler is effected by means of a screw threaded shaft 62 which operatively engages a screw threaded bore 64 formed in the traveler 60 and is driven through the medium of suitable reduction gearing 66 by an electric motor 68 mounted in the pit 38, and is best shown in Figure 3.

A liftable and lowerable carrier 70 is mounted upon the traveler 60, being vertically slidable on a plurality of guide rods 72 and being raised and lowered by means of a screw threaded shaft 74 rotatable in a screw threaded bore 76 in the traveler 60. (See Figure 3.) The traveler 60 is formed with a recess 78 in which is disposed a wheel 80 secured to the shaft 74, the wheel 80 being formed in the circumferential portion thereof with radial apertures 82 to accommodate a hand bar, or the like (not shown), whereby the wheel 80 may be rotated together with the shaft 74, and the carrier 70 raised or lowered as desired. Alternatively, power driven means may, of course, be employed for raising and lowering the carrier.

The carrier 70 includes pairs of upstanding bearing blocks 84 in which is journalled a rotatable arbor 86 consisting of a pair of axially aligned and longitudinally slidable sections 88, 90, these being connected together for slidable but simultaneously rotatable relation by means of a suitable tongue and groove arrangement shown at 92 in Figure 3. The arbor sections 88, 90 are provided adjacent the tongue and groove connection 92 with a pair of shoulders 94, and a compression spring 96 is positioned between those shoulders, so that the arbor sections 88, 90 are urged by the spring outwardly in relatively opposite directions, as indicated by the arrows 98 (see Figure 3).

According to the present invention, cutting tools 100 are mounted on the arbor sections 88, 90, each of these cutters being engageable with one of the pair of wheels 26, as is best shown in Figure 3. The cutting tools 100 preferably take the form of a contoured milling cutter shaped to conformably shape the tread of the wheel being trued upon affecting a single cut on the peripheral surface of the wheel. Moreover, means are provided for maintaining the tools 100 in proper alignment with the wheels, these means including what may be referred to as a pair of gaging fingers 102 which are rotatably positioned on the arbor sections 88, 90 adjacent annular shoulders 104, so that these shoulders 104 responding to the resiliency of the compression spring 96, urge the fingers 102 outwardly in opposite directions (see arrows 98).

The fingers 102 are formed with outwardly angulated portions carrying rotatable wheels or rollers 106 which, in turn, are intended to engage the inner surfaces of the vehicle wheels 26, whereby outward sliding movement of the arbor sections 88, 90 is restricted to an extent where the tools 100 are properly aligned with the wheel treads. In this connection it should be explained that although the wheel tread on different railways is standardized, the above-described adjustment of the spacing between the truing tools 100 compensates for any discrepancy such as may exist in the generally standardized spacing of the wheels on various vehicles.

In any event, it will be apparent from the foregoing that after the locomotive 22 is stationed on the track sections 34, 36 and the rail pieces 40 are removed, as above explained, the traveler 60 and the carrier 70 are manipulated so as to bring the truing tools 100 in engagement with the tread of the vehicle wheels 26, as shown in Figure 1. It is to be noted that the lateral adjustment of the traveler 60 on the bed 54 as well as the vertical adjustment of the carrier 70 on the traveler 60 permit the tools 100 to move into position in engagement with the wheels 26, but, at the same time, the truing tools may be lowered and slid outwardly in a lateral direction, so as to facilitate reinstallation of the rail pieces 40 between the track sections 34, 36.

The arbor 86, together with the tools 100, is rotated as indicated by the arrow 108 in Figure 1 by means of a suitable electric motor 110 mounted in the pit 38 and operatively connected through the medium of a gear box 112 and a universally jointed shaft 114 to a splined coupling 116 which, in turn, is separably connectible to a splined portion 118 provided on the arbor section 90, as is best shown in Figures 2 and 3.

Means are also provided for releasably retaining the arbor sections 88, 90, together with the associated gaging fingers 102 in a retracted, or an inwardly drawn position, so to speak, so as to permit the gaging fingers to be moved into and out of position between the wheels 26. These means consist of suitable screws 120 extending slidably through two of the aforementioned blocks 84 and having screw-threaded shanks engaging screw-threaded apertures in the fingers 102, as indicated in Figure 3. When the screws 120 are loosened as shown in Figure 3, the gaging fingers 102 are free to be urged in engagement with the inner surfaces of the wheels 26 by the resiliency of the spring 96, but by simply tightening the screws 120 so that the heads thereof engage the adjacent block 84, the fingers 102 may be drawn inwardly and the rollers 106 may thus be disengaged from the wheels 26 for the purpose of raising or lowering the carrier 70 without interference of the fingers 102 with the vehicle wheels.

Means, hereinafter detailed, are employed for turning the wheels 26 in the direction of the arrow 122, through at least one complete revolution, while the truing tools 100 are being rotated in the direction of the arrow 108 (see Figure 1), so that the wheel tread truing operation will be effected simultaneously on the two wheels 26 in the pair upon only a single complete revolution of the wheels.

In order to insure proper centering of the wheels 26 to the cutting tools 100 and prevent chatter of the wheels during the cutting operation, suitable centering units 124 are applied to the wheels 26, these units consisting of cables 126 connected to articulated links 128 carrying pressure blocks 130, the latter being engageable with the upper peripheric portions of the wheels 26, as illustrated in Figures 1 and 7. The free end portions of the cables 126 are, in turn, connected through the medium of suitable tension springs 129 to anchoring blocks 131 separably clamped to the track sections 34, 36, as will be clearly apparent.

The aforementioned means for rotating the wheels 26 while the truing operation is in progress consists of a cradle 132 which is intended to be assembled around or placed under the wheels 24, as shown in Figures 1, 2 and 6.

The cradle 132 includes a driving shaft 134 carrying a pair of knurled rollers 136 engageable with the peripheries of the wheels 24, the shaft 134 being driven through the medium of suitable gear boxes 138, 140 by an electric motor 142 operated at a proper speed correlated to conventional milling operations so that the wheels may be accurately trued by taking a single cut on the wheel peripheries.

The motor 142, as well as the gear boxes 138, 140, are preferably mounted upon an elongated base plate 144 which is longitudinally adjustable in a further pit 146 provided in the concrete bed 32 at one side of the track section 34, as illustrated in Figure 2. A similar pit 148 is provided in the bed 32 at one side of the track section 36, the purpose of which will be hereinafter more fully described. The adjustment of the plate 144 is facilitated by means of suitable bolts 152 receivable in longitudinal slots 154 with which the plate 104 is provided (see Figure 2), this adjustment assuring that the rollers 136 may be brought in frictional engagement with the periphery of the wheels 24 regardless of the spacing of the wheels 24 from the wheels 26. In other words, this adjustment assures that the rollers 136 are in engagement with the wheels 24 while the wheels 26 are engaged by the truing tools 100, notwithstanding the "wheel base" distance between the wheels 24, 26.

The cradle 132 also includes a rotatable shaft 156 carrying guide rollers 158 which are also engageable with the periphery of the wheels 24, the shaft 156 being adjustable in suitable blocks 160 formed in the cradle 132 (see Figure 6) and the adjustment of this shaft being effected by suitable adjustment screws and blocks designated collectively by the reference character 162. (See Figures 1 and 2.) By virtue of this arrangement, the distance or spacing between the shafts 134, 156 in the cradle 132 may be increased or decreased by simply loosening or tightening the adjusting screws and blocks 162, so that the rollers 136, 158 may satisfactorily engage the periphery of the wheels 24 regardless of the wheel diameter.

It will be apparent from the foregoing that rotation of the motor 142 will be transmitted by the rollers 136 in the cradle 132 to produce a rotation through at least 360° of arc of the vehicle wheels 24 which, in turn, will rotate the wheels 26, 28 through the medium of the connecting rods 30. Accordingly, the wheels 26 may be rotated through at least one complete revolution while the truing tools 100 are being driven by the motor 68 as has been already described, so that truing of the wheel tread along the entire peripheries of the wheels 26 will be facilitated by the cutting or milling action of the cutters 100.

It should be understood that the wheel rotating means positioned in the pit 146 may be transposed into the pit 148, so that the drive may be applied to the front wheels 28 in place of the rear wheels 24. Alternatively, the wheels 28 and the wheels 24 may be trued while rotating the intermediate wheel 26 with the motor 142, etc. disposed in the pit 148 or 146, as the case may be. In any event, it will be apparent that the wheel tread and truing operation may be undertaken without the conventionally experienced necessity of disassembling the connecting rods 30 and removing the wheels from the vehicle.

Figure 9:
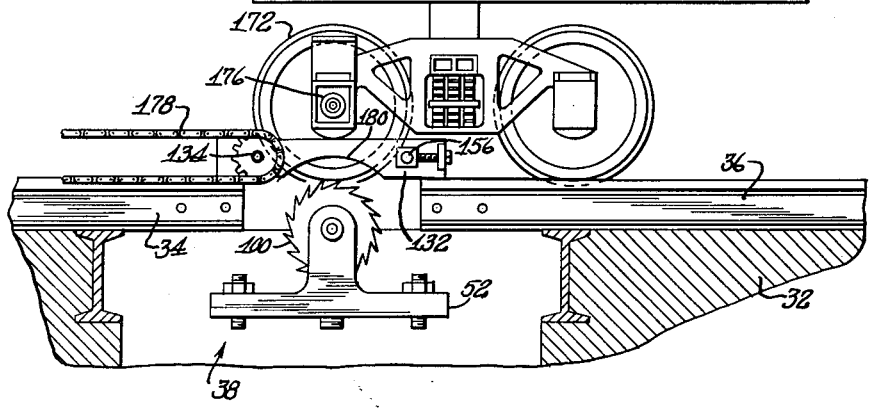

Referring now to the accompanying Figures 8 and 9, the same illustrate the teachings of the invention employed for the purpose of truing wheel treads on passenger cars, box cars, and the like 170, such as are usually equipped with pairs of wheels 172 connected together by a rigid axle 174 equipped with outside journals 176. In such instances, the truing tools 100 of the truing machine 52 again take the form of a contoured milling cutter and perform the truing operation on the same pair of wheels to which rotation is imparted by the driving cradle 132, but in this instance the driving shaft 134 of the cradle is connected to the reduction gear box 138 (not shown in Figure 9 but shown in Figure 1) by a suitable chain drive 178. It will be apparent that by this arrangement the mechanism 142, 140, 138 may remain in the pit 146 or 148, as desired, without obstructing the truing machine 52 in the pit 38. The cradle 132 is provided at the sides thereof with relieved portions or recesses 180, which serve to provide clearance for the tools 100, as is best shown in Figure 9.

When truing car wheels 172, the vehicle 170 is not raised by jacks, or the like, such as shown at 50 in Figure 1, but is directly supported by the centering means which in this embodiment take the form of tail stocks 182, equipped with vertical adjusting means 184. The "centers" of the journals 176 are engaged thereby to support the axle 174 and the wheels 172 in proper centered relation for accurately truing the tread by the tools 100. The tail stock 182 are shown in this illustrative embodiment positioned upon suitable plates 186 which span the pit 38, the plates 186 being removable when not required but being normally in firm fixed assembly relative to the means supporting the tools 100.

It is to be observed that when car wheels are being trued, the cradle 132 bridges the gap or space between the track sections 34, 36, rather than being positioned on one of the track sections, as in Figure 1. This "bridging" disposition of the cradle 132 may be employed whenever rotation is to be imparted to the same set of wheels which are being trued, and the arrangement is, therefore, also useful for turning and truing a pair of driving wheels of a locomotive when the connecting rods thereof have been removed for purposes other than wheel truing, such as, for example, in a major overhaul.

It should be understood that the wheel truing apparatus may be expanded, so to speak, by enlarging the pit 38 and providing additional machines 52 so that two or more pairs of wheels may be trued simultaneously.

It will be apparent that the arrangement described permits the accurate truing of a wheel or a vehicle upon a single rotation of the wheel relative to a contoured milling cutter and without requiring removal of the wheels from the vehicle.

It will be understood that modifications and variations may be effected without departing from the scope of the novel concepts of the present invention.

I claim as my invention:

1. In a machine for truing treads and flanges on a pair of flanged wheels spaced and rigidly connected by an axle, the combination of a frame provided with inner and outer pairs of brackets affording a set of axially aligned bearings, a pair of complemental arbor sections rotatably and slidably journaled in said bearings, means at the adjacent inner ends of said arbor sections for slidably connecting the latter for simultaneous rotation, power-driven means connected to the outer end of one of said arbor sections for rotating the same, a disc-shaped truing tool secured to each section and having a periphery complemental to and at least as wide as the tread and flange of a wheel being trued, a pair of shoulders provided on the adjacent inner end portions of the respective arbor sections, a compression spring positioned on the arbor sections between said shoulders for sliding said tools outwardly in opposite directions, a pair of additional shoulders provided on the respective arbor sections between said inner and outer brackets, a pair of fingers rotatably positioned on the respective arbor sections outside of said last-mentioned shoulders whereby the fingers are slid outwardly together with the arbor sections, rollers provided on said fingers and engageable with inner faces of the wheels being trued, and means for locking said sections and the associated tools and fingers against outward sliding by the resiliency of said spring.

2. The device as defined in claim 1 wherein said inner brackets are provided with a pair of apertures, said last mentioned means comprising a pair of screws provided on the respective fingers and extending inwardly through the respective apertures, said screws having enlarged heads engageable with inner surfaces of the inner brackets to prevent outward sliding of said arbor sections.

3. In a machine for truing treads on a pair of wheels spaced and rigidly connected by an axle, the combination of a rotatable arbor including a pair of coaxial and longitudinally slidable sections, means at adjacent ends of said sections for operatively connecting the same together for simultaneous rotation, means for rotating said sections, a pair of truing tools secured to the respective arbor sections, resilient means urging said sections to slide outwardly in opposite directions, a pair of gauging fingers carried by the respective sections and slidable therewith to engage inner faces of wheels being trued whereby said truing tools are sustained in alignment with the treads of the stated wheels, and means for locking said sections and the associated tools and fingers against outward sliding by the action of said resilient means.

4. In a machine for truing treads on a pair of flanged wheels spaced and rigidly connected by an axle, the combination of a rotatable arbor including a pair of axially adjustable arbor sections, a drive motor for rotating said arbor sections simultaneously, a full width contour milling cutter shaped to concurrently cut the flange and tread for each respective flanged wheel and being mounted on each arbor section, biasing means for moving said arbor sections outwardly, and gaging stop means on each arbor section sustaining each milling cutter in alignment with the peripheral surface of each corresponding wheel and including means for selectively locking said arbor sections against axial movement.

5. In a machine for truing treads on a pair of flanged wheels spaced and rigidly connected by an axle, the combination of a rotatable arbor including a pair of axially adjustable arbor sections, a drive motor for rotating said arbor sections simultaneously, a full width contour milling cutter shaped to concurrently cut the flange and tread of a flanged wheel and being mounted on each arbor section, biasing means for moving said arbor sections outwardly, gaging stop means on each arbor section sustaining each milling cutter in alignment with the peripheral surface of each corresponding wheel and including means for selectively locking said arbor sections against axial movement, and positioning means aligning said contour milling cutters in predetermined spaced relationship with the center of said axle and at cutting depth with the peripheral surface of each of the wheels.

6. In a machine as defined in claim 5, said positioning means comprising a restraining unit having a cable to engage the peripheral surface of the wheel diametrically opposite said contour milling cutter and connecting means including a tension spring stationarily anchoring the ends of said cable relative to said contour milling cutter.

7. In a machine as defined in claim 5, said positioning means comprising spaced tail stock centers respectively engaging opposite ends of said axle and being stationary relative to said contour milling cutters.

8. In a wheel truing machine, a frame, power actuated means on said frame to rotatably support a pair of flanged wheels spaced and rigidly connected by a common axle, axially aligned bearing means on said frame, an arbor rotatably journaled in each of said bearing means, a full width contour milling cutter on each arbor for each respective wheel and having a periphery complementary to the tread and flange of the wheel being trued, a common drive motor having a rotating driving connection with each of said arbors to actuate said contour milling cutters simultaneously, and gaging stop means on each of said arbors axially positioning said contour milling cutters in spaced apart relation and in proper alignment with each respective flanged wheel.

9. In a wheel truing machine as defined in claim 8, said gaging stop means including wheel engaging locking members engagingly abutting the inner faces of the wheels being trued and connected with each of said arbors to check outward movement of said contour milling cutters.

10. In a wheel truing machine, a frame, power actuated means on said frame to rotatably support a pair of flanged wheels spaced and rigidly connected by a common axle, axially aligned bearing means on said frame, an arbor rotatably journaled in each of said bearing means, a full width contour milling cutter on each arbor for each respective wheel and having a periphery complemental to the tread and flange of the wheel being trued, a common drive motor having a rotating driving connection with each of said arbors to actuate said contour milling cutters simultaneously and gaging stop means on each of said arbors axially positioning said contour milling cutters in spaced apart relation and in proper alignment with each respective flanged wheel including a spring between said arbors continuously biasing said arbors outwardly, and a gaging finger means on each of said arbors engaging the inner face of each respective wheel to limit outward movement of said contour milling cutters.

11. In a wheel truing machine, a frame, a power actuated driving cradle rotatably supporting on said frame a pair of flanged wheels spaced and rigidly connected by a common axle, a contour milling cutter shaped to cut the full width peripheral contour of a tread and a flange for each respective wheel, and positioning means on said frame including tail stock members engaging said axle to align said cutters in radially aligned relationship to the axle center, said positioning means further including adjustable members to relatively adjust said radial alignment for varying the cutting depth of said cutters relative to said wheels, drive means on said cradle including interconnected rotatably driven wheel drive roller members each providing a peripheral driving surface constructed and arranged to engage the peripheral surface of a corresponding one of said flanged wheels for rotating said wheels at milling feed speed, thereby to cut both of said wheels to truth upon a single revolution of said wheels, and arbor means journaled in said frame and carrying said cutters in predetermined axially aligned position relative said wheels, said arbor means comprising a separate arbor section carrying each respective milling cutter, power driven means concurrently rotating each arbor section, means to move each arbor section outwardly with respect to a corresponding wheel, and locking means for selectively locking said arbor sections against axial movement.

12. In a wheel truing machine as defined in claim 11, each arbor section further including a stop member engaging the inner surface of each respective wheel to limit outward movement of the milling cutters.

13. In a machine for truing treads on a pair of flanged wheels spaced and rigidly connected by an axle, the combination of a rotatable arbor including a pair of axially adjustable arbor sections, drive motor means for rotating said arbor sections simultaneously, a full width contour milling cutter shaped to concurrently cut the flange and tread of a flanged wheel and being mounted on each arbor section, adjustment means for adjusting said arbor sections axially with respect to each corresponding wheel, locking means for each arbor section sustaining each milling cutter in alignment with the peripheral surface of each corresponding wheel and including means for selectively locking said arbor sections against axial movement relative to each corresponding wheel, driving means for rotating said wheels including a pair of drive rollers spaced and rigidly connected by a rotatable shaft, each drive roller providing a peripheral driving surface in driving engagement with the peripheral surface of a corresponding one of said flanged wheels for rotating said wheels relative to said cutter at milling feed speed, and positioning means aligning said contour milling cutters in predetermined spaced relationship with the center of said axle and at cutting depth with the peripheral surface of each of the wheels.

14. In a machine as defined in claim 13, said positioning means comprising a restraining unit having a cable to engage the peripheral surface of the wheel diametrically opposite said contour milling cutter and connecting means including a tension spring stationarily anchoring the ends of said cable relative to said contour milling cutter.

15. In a machine as defined in claim 13, said positioning means comprising spaced tail stock centers respectively engaging opposite ends of said axle and being stationary relative to said contour milling cutters.

References Cited in the file of this patent

UNITED STATES PATENTS

| Number | Name | Date |
|---|---|---|
| 449,350 | Elder | Mar. 31, 1891 |
| 573,694 | Pedrick | Dec. 22, 1896 |
| 1,627,074 | Blair et al. | May 3, 1927 |
| 2,105,316 | Fleming | Jan. 11, 1938 |

FOREIGN PATENTS

| Number | Country | Date |
|---|---|---|
| 71,801 | Germany | Nov. 1, 1893 |